3,175,952
AQUEOUS RADIOPAQUE SOLUTIONS CONTAINING SODIUM AND CALCIUM IONS

Joseph G. Bird, East Greenbush, N.Y., assignor to Sterling Drug Inc., New York, N.Y., a corporation of Delaware
No Drawing. Filed May 29, 1963, Ser. No. 283,989
13 Claims. (Cl. 167—95)

This invention relates to novel compositions for use in radiopaque X-ray diagnostic examinations and to a method for such use. In particular the invention is concerned with concentrated aqueous solutions of salts of iodinated organic acids containing both sodium and calcium ions, and to a method for using such solutions.

It is known to carry out radiological examinations, as in cardiovascular angiography, urography and cholecystography, by intravascular injection of aqueous solutions of highly water-soluble salts of iodinated acids of low toxicity. In the large majority of cases these examinations are conducted unaccompanied by serious untoward side-effects. However, in occasional sensitive individuals severe reactions have occurred suddenly and without warning resulting in cardiovascular collapse which has on occasion been fatal. The risk of such reactions is especially prominent in the field of cardiovascular angiography where concentrated solutions (50–90%) are employed. It is therefore highly desirable to find an X-ray contrast medium which possesses significantly decreased systemic and cardiac toxicity relative to the media presently available in order to lessen the probability of the occurrence of major side reactions.

It has now unexpectedly been found that the inclusion of calcium ion together with the sodium ion in a solution containing the radiopaque anion significantly decreases the systemic and cardiac toxicity as compared with the toxicity of the sodium or calcium salt alone. This advantageous toxicity reduction is observed when the calcium ion is present in an amount such that the ratio of sodium to calcium by weight is between about 5 and 75. The optimum ratio appears to be about that found in normal mammalian blood plasma (approximately 30). It is preferable that the combination of sodium and calcium ions present be approximately equivalent to the amount of radiopaque acid anion; in other words, that the calcium be added in the form of the calcium salt of the radiopaque acid, or produced in solution by the addition of an equivalent amount of calcium hydroxide to the free radiopaque acid.

The present invention thus resides in the concept of a composition of matter comprising an aqueous solution containing at least about 10% by weight of the anion of an iodinated organic acid of low intravenous toxicity, also containing sodium and calcium ions such that the sodium/calcium ratio by weight is between about 5 and about 75.

The radiopaque iodinated acid used in preparing the composition of the present invention can be any iodinated acid whose sodium salt is sufficiently water-soluble (to at least about 10%, weight per unit volume) and has a low intravenous toxicity ($LD_{50}$ above about 3000 mg./kg.). Illustrative of the radiopaque acids which can be used are the following: 3,5-diacylamino-2,4,6-triiodobenzoic acids, for example, diatrizoic acid (3,5-diacetamido-2,4,6-triiodobenzoic acid) and homologs thereof, including metrizoic acid (N-methyl-3,5-diacetamido-2,4,6-triiodobenzoic acid); 5-acylamino-2,4,6-triiodo-N-alkylisophthalamic acids, for example, iothalamic acid (5-acetamido-2,4,6-triiodo-N-methylisophthalamic acid) and homologs thereof; 3-acylamino-2,4,6-triiodobenzoic acids, for example, acetrizoic acid (3-acetamido-2,4,6-triiodobenzoic acid) and homologs thereof; iodomethamic acid (1-methyl-3,5-diiodo-4-pyridone-2,6 - dicarboxylate); iodipamidic acid [N,N'-adipyl-bis(3-amino-2,4,6 - triiodobenzoate)] and iodomethanesulfonic acid (the acid moiety of methiodal sodium). These and other appropriate radiopaque acids are disclosed for instance in U.S. Patents 1,842,626, 1,919,417, 2,611,786, 2,776,241, 3,076,024; and Belgian Patents 597,848, 607,551, 614,519.

The compositions of the invention are prepared by dissolving calculated amounts of the sodium and calcium salts of the radiopaque acid in pure water, or neutralizing the free radiopaque acid in equivalent amounts of sodium hydroxide and calcium hydroxide to form the salts directly in solution. A trace of the disodium calcium salt of ethylenediaminetetraacetic acid may be added to remove traces of heavy metal ions and stabilize the solution against change in pH. Prior to use, the solutions are sterile-filled or autoclaved.

When the intravenous toxicity of the compositions of the invention containing an optimum amount of calcium was measured in mice, it was found that the $LD_{50}$ value increased from 25 to 50% compared with the $LD_{50}$ value for the sodium salts alone. The presence of the calcium also counteracted to a significant degree the cardiac depression noted with solutions of the sodium salts alone when measured in the perfused, isolated rabbit heart.

The following examples will further illustrate the invention without the latter being limited thereby.

EXAMPLE 1

*Compositions containing the sodium and calcium salts of N-methyl-3,5-diacetamido-2,4,6 - triiodobenzoic acid (metrizoic acid)*

(A) (CONTROL)

| | |
|---|---|
| Sodium metrizoate _____ g__ | 75.0 |
| CaNa₂ ethylenediaminetetraacetate _____ g__ | 0.025 |
| Distilled water to total volume of 100 ml.: | |
| Adjusted pH _____ | 7.3 |
| Heated at 121° C. for 15 min., pH _____ | 7.45 |

(B)

| | |
|---|---|
| Sodium metrizoate _____ g__ | 72.4 |
| Calcium metrizoate _____ g__ | 2.59 |
| CaNa₂ EDTA _____ g__ | 0.025 |
| Distilled water to total volume of 100 ml.: | |
| Adjusted pH _____ | 7.3 |
| Heated at 121° C. for 15 min., pH _____ | 7.4 |
| Weight Na _____ g__ | 2.56 |
| Weight Ca _____ g__ | 0.08 |
| Ratio Na/Ca _____ | 32 |

(C)

| | |
|---|---|
| Sodium metrizoate _____ g__ | 69.8 |
| Calcium metrizoate _____ g__ | 5.18 |
| CaNa₂ EDTA _____ g__ | 0.025 |
| Distilled water to total volume of 100 ml.: | |
| Adjusted pH _____ | 7.35 |
| Heated at 121° C. for 15 min., pH _____ | 7.25 |
| Weight Na _____ g__ | 2.47 |
| Weight Ca _____ g__ | 0.16 |
| Ratio Na/Ca _____ | 15.4 |

(D)

| | |
|---|---|
| Sodium metrizoate | g-- 64.6 |
| Metrizoic acid | g-- 10.05 |
| Calcium hydroxide | g-- 0.590 |
| CaNa$_2$ EDTA | g-- 0.025 |
| Distilled water to total volume of 100 ml.: | |
| Adjusted pH | 7.35 |
| Heated at 121° C. for 15 min., pH | 7.20 |
| Weight Na | g-- 2.29 |
| Weight Ca | g-- 0.32 |
| Ratio Na/Ca | 7.1 |

| Formulation: | Toxicity, LD$_{50}$ mice I.V. mg./kg. |
|---|---|
| A | 12,200±806. |
| B | 16,600±1340. |
| C | 17,000±853. |
| D | 15,800±1100. |

When measured in the perfused, isolated rabbit heart, formulations B, C and D cause less of a decrease in the heart force than the control formulation A. In fact, formulations C and D at lower dose levels actually caused an increase in the heart force.

A comparable formulation containing sodium metrizoate and calcium metrizoate having a sodium/calcium ratio of about 64 had an intravenous LD$_{50}$ value of 15,800±826 mg./kg.

Calcium metrizoate alone has a solubility of about 20% in water at room temperature and an intravenous toxicity, LD$_{50}$=2480±195 mg./kg.

EXAMPLE 2

*Composition containing the sodium and calcium salts of 5-acetamido-2,4,6-triiodo-N - methylisophthalamic acid (iothalamic acid)*

| | |
|---|---|
| Sodium iothalamate (100 ml. 80% soln.) | g-- 80.0 |
| Calcium iothalamate | g-- 2.75 |
| Adjusted pH | 7.2 |
| Weight Na | g-- 3.02 |
| Weight Ca | g-- 0.087 |
| Ratio Na/Ca | 35 |

The intravenous toxicity in mice of the above composition was determined: LD$_{50}$=17,500±1885 mg./kg. The toxicity of sodium iothalamate alone was found to be: LD$_{50}$=11,600±1170 mg./kg.; and of calcium iothalamate alone: LD$_{50}$=2000±165 mg./kg.

EXAMPLE 3

*Composition containing the sodium and calcium salts of 3,5-diacetamido - 2,4,6 - triiodobenzoic acid (diatrizoic acid)*

(A) (CONTROL)

| | |
|---|---|
| Diatrizoic acid | g-- 48.27 |
| Sodium hydroxide | g-- 3.144 |
| CaNa$_2$ EDTA | g-- 0.01 |
| Distilled water to total volume of 100 ml.: | |
| Adjusted pH | 7.3 |
| Heated at 121° C. for 15 min., pH | 7.3 |

(B)

| | |
|---|---|
| Diatrizoic acid | g---- 45.21 |
| Sodium hydroxide | g---- 2.948 |
| Calcium diatrizoate | g---- 3.16 |
| CaNa$_2$ EDTA | g---- 0.01 |
| Distilled water to total volume of 100 ml.: | |
| Adjusted pH | 7.35 |
| Heated at 121° C. for 15 min., pH | 6.7 |
| Weight Na | g---- 1.70 |
| Weight Ca | g---- 0.10 |
| Ratio Na/Ca | 17 |

| Formulation: | Toxcity, LD$_{50}$ Mice. I.V. mg./kg. |
|---|---|
| A | 11,900±615 |
| B | 15,400±830 |
| Calcium diatrizoate | 2,940±156 |

I claim:

1. A composition for use in radiopaque X-ray diagnostic examinations comprising an aqueous solution containing at least about 10% by weight of the anion of an iodinated organic acid, effective as an X-ray contrast agent and having low intravenous toxicity, the cation content of the solution comprising sodium and calcium such that the sodium/calcium ratio by weight is between about 5 and about 75.

2. A composition for use in radiopaque X-ray diagnostic examinations comprising an aqueous solution containing the sodium and calcium salts of an iodinated organic acid, effective as an X-ray contrast agent and having low intravenous toxicity, the combined weights of the salts being at least about 10% that of the entire solution, and the sodium/calcium ratio by weight being between about 5 and about 75.

3. A composition for use in radiopaque X-ray diagnostic examinations comprising an aqueous solution containing the sodium and calcium salts of N-methyl-3,5-diacetamido-2,4,6-triiodobenzoic acid, the combined weights of the salts being at least about 10% that of the entire solution, and the sodium/calcium ratio by weight being between about 5 and about 75.

4. A composition for use in radiopaque X-ray diagnostic examinations comprising an aqueous solution containing the sodium and calcium salts of 5-acetamido-2,4,6-triiodo-N-methylisophthalmic acid, the combined weights of the salts being at least about 10% that of the entire solution, and the sodium/calcium ratio by weight being between about 5 and about 75.

5. A composition for use in radiopaque X-ray diagnostic examinations comprising an aqueous solution containing the sodium and calcium salts of 3,5-diacetamido-2,4,6-triiodobenzoic acid, the combined weights of the salts being at least about 10% that of the entire solution, and the sodium/calcium ratio by weight being between about 5 and about 75.

6. A composition for use in cardiovascular angiography comprising an aqueous solution containing the sodium and calcium salts of N-methyl-3,5-diacetamido-2,4,6-triiodobenzoic acid, the combined weights of the salts being at least about 50% that of the entire solution, and the sodium/calcium ratio by weight approximately 30.

7. A composition for use in cardiovascular angiography comprising an aqueous solution containing the sodium and calcium salts of 5-acetamido-2,4,6-triiodo-N-methylisophthalmic acid, the combined weights of the salts being at least about 50% that of the entire solution, and the sodium/calcium ratio by weight approximately 30.

8. A composition for use in cardiovascular angiography comprising an aqueous solution containing the sodium and calcium salts of 3,5-diacetamido-2,4,6- triiodobenzoic acid, the combined weights of the salts being at least about 50% that of the entire solution, and the sodium/calcium ratio by weight approximately 30.

9. A method for carrying out radioaque X-ray diagnostic examinations which includes the step of injecting intravascularly an aqueous solution containing at least about 10% by weight of the anion of an iodinated organic acid, effective as an X-ray contrast agent and having low intravenous toxicity, the cation content of the solution comprising sodium and calcium such that the sodium/calcium ratio by weight is between about 5 and about 75.

10. A method for carrying out radiopaque X-ray diagnostic examinations which includes the step of injecting intravascularly an aqueous solution containing the sodium and calcium salts of an iodinated organic acid, effective as an X-ray contrast agent and having low intravenous toxicity, the combined weights of the salts being at least about 10% that of the entire solution, and the sodium/ calcium ratio by weight being between about 5 and about 75.

11. A method of carrying out radiopaque X-ray diagnostic examinations which includes the step of injecting intravascularly an aqueous solution containing the sodium and calcium salts of N-methyl-3,5-diacetamido-2,4,6-triiodobenzoic acid, the combined weights of the salts being at least about 50% that of the entire solution, and the sodium/calcium ratio by weight approximately 30.

12. A method for carrying out radiopaque X-ray diagnostic examinations which includes the step of injecting intravascularly an aqueous solution containing the sodium and calcium salts of 5-acetamido-2,4,6-triiodo-N-methyl-isophthalamic acid, the combined weights of the salts being at least about 50% that of the entire solution, and the sodium/calcium ratio by weight approximately 30.

13. A method for carrying out radiopaque X-ray diagnostic examinations which includes the step of injecting intravascularly an aqueous solution containing the sodium and calcium salts of 3,5-diacetamido-2,4,6-triiodobenzoic acid, the combined weights of the salts being at least about 50% that of the entire solution, and the sodium/calcium ratio by weight approximately 30.

References Cited by the Examiner

UNITED STATES PATENTS

| | | | |
|---|---|---|---|
| 1,842,626 | 1/32 | Ossenbeck et al. | 167—95 X |
| 1,868,602 | 7/32 | Hecht et al. | 167—95 |
| 1,919,417 | 7/33 | Dohrn | 167—95 X |
| 2,611,786 | 9/52 | Wallingford | 167—95 X |
| 3,033,757 | 5/62 | Hallett | 167—95 |
| 3,076,024 | 1/63 | Larsen | 167—95 X |
| 3,102,880 | 9/63 | Rands | 167—95 X |

FOREIGN PATENTS 736,432   9/55   Great Britain.

OTHER REFERENCES

Annals of the New York Academy of Sciences, Vol. 78, Art. 3, pp. 710–715 and 764.

JAMA, Vol. 160, No. 16, p. 1405, April 21, 1956.

JULIAN S. LEVITT, *Primary Examiner.*

FRANK CACCIAPAGLIA, JR., *Examiner.*